United States Patent [19]

Young

[11] Patent Number: 4,838,204
[45] Date of Patent: Jun. 13, 1989

[54] ANIMAL CAGE ASSEMBLY

[76] Inventor: Joseph D. Young, Rte. 2, Box 35, Brookline, Miss. 65619

[21] Appl. No.: 65,733

[22] Filed: Jun. 24, 1987

[51] Int. Cl.⁴ .............................................. A01K 31/00
[52] U.S. Cl. ...................................................... 119/17
[58] Field of Search ..................... 119/17, 22, 15, 1, 19

[56] References Cited

U.S. PATENT DOCUMENTS

| | | | |
|---|---|---|---|
| 1,186,782 | 6/1916 | Hercer | 119/17 |
| 2,189,449 | 2/1940 | Morris | 119/17 |
| 2,983,251 | 5/1961 | Lingis | 119/17 |
| 3,815,549 | 6/1974 | Opmeer | 119/17 |
| 4,572,107 | 2/1986 | Clarizo | 119/17 |

*Primary Examiner*—John J. Wilson
*Assistant Examiner*—Adriene J. Lepiane
*Attorney, Agent, or Firm*—Griffin, Branigan & Butler

[57] ABSTRACT

An animal cage assembly (10) comprises a cage (12) supported by a base assembly having two opposite, inwardly and downwardly sloping baffles (34 and 36) which are spaced from one another to form a gap (38) therebetween positioned below the cage and a tray (68) positioned below the gap. There are two paper roll holders (54 and 56) each positioned adjacent a respective sloping baffle for providing paper (76) which can be pulled across a respective baffle for periodically replacing the paper on the baffle. The base assembly is comprised of a mounting frame (16) for holding the tray, and an insert member (14) which is removably mounted on the mounting frame and includes the baffles. Both the mounting frame and the insert member have solid end walls (44a and 44b and 30a and 30b) with the paper roll holders being mounted on the outside of the mounting frame's end walls. The paper passes through slots in the end walls adjacent the sloping baffles through which it can be pulled from rolls mounted in the paper roll holders. Blades (58 and 60) are positioned on the outside of outlet slots (52a and 52b) against which the paper can be urged for cutting the paper in a straight line.

16 Claims, 2 Drawing Sheets

4,838,204

ANIMAL CAGE ASSEMBLY

BACKGROUND OF THE INVENTION

This invention relates broadly to the art of household animal cages and more specifically to easily cleanable bird cages.

The cleaning of household animal cages, and especially bird cages, has long presented a difficult problem to animal lovers. Owning caged household animals often involves a compromise between not performing an inordinate amount of cleaning and having a barely acceptable dirty cage. It is an object of this invention to provide an animal cage assembly which can be kept clean with a very small amount of work so that an owner of a caged household animal can maintain a clean cage without expending an undue amount of work.

A number of easy-to-clean animal cage assemblies have been suggested which include rolls of paper adjacent to floors of cages from which paper can be pulled across the floors to periodically clean the floors. Patents which have suggested this include U.S. Pat. No. 2,983,251 to Lingis and U.S. Pat. No. 2,189,449 to Morris. A major difficulty in the use of these cage assemblies is that feed and other dry materials easily work their way under the paper and are not taken out of the cages by pulling the paper across the floors. Thus, it is an object of this invention to provide an easily cleanable animal cage which automatically cleans dried feed and other dried material from the cage.

U.S. Pat. No. 4,572,107 to Clarizo discloses a bird cage having a slatted floor with four sloping walls thereunder to form a funnel for guiding dried materials into a sack located thereunder. The four sloping walls can have newspaper mounted thereon to prevent sticky material, such as bird excrement, from sticking thereto. Although this bird cage assembly provides some improvements over other prior-art cage assemblies, it has several major disadvantages. One of the disadvantages is that paper pieces must be especially cut to fit the non-rectangular walls thereof, which is time-consuming. Further, where the four pieces of paper come together there are still slits located directly below a bird cage floor through which bird excrement can fall. Thus, the walls can still get dirty. Still further, the pieces of paper are held in place at their upper ends, however, the lower ends thereof are free to flap and could thereby be pulled away from their respective walls leaving additional gaps between the sheets through which excrement might fall. Thus, it is an object of this invention to provide an animal cage assembly which can be easily cleaned, which does not involve pieces of paper cut to special shapes, and which does not involve so many pieces of paper. Further, it is an object of this invention to provide such an animal cage in which paper sheets covering baffles do not have gaps between the sheets which can expose the baffles.

SUMMARY

According to principles of this invention, two inwardly and downwardly sloping baffles are spaced from one another to form a gap therebetween below a slatted floor of a cage. The baffles and the gap cover the area lying vertically under the cage floor whereby materials falling vertically downwardly through openings in the cage floor come into contact with one of the two baffles or pass through the gap therebetween. There are two paper roll holders each positioned on the side of the cage adjacent its respective sloping baffle for holding paper which can be pulled across the baffle to periodically clean away excrement which has fallen on the paper. Blades are located on the sides of the cage opposite to the sides on which the paper roll holders are mounted so that one can urge the paper thereagainst for cutting it on a straight line. A base assembly of the animal cage assembly is comprised of an insert and a mounting frame. The insert rests in the mounting frame and the cage rests on the insert. The insert has the baffles formed integrally therewith and the mounting frame has a drawer therein positioned below the gap between the two baffles for catching materials falling therebetween. Both the insert and the mounted frame have solid end walls with slots therein through which the paper is pulled from the paper roll holders mounted on the outside of the wall.

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
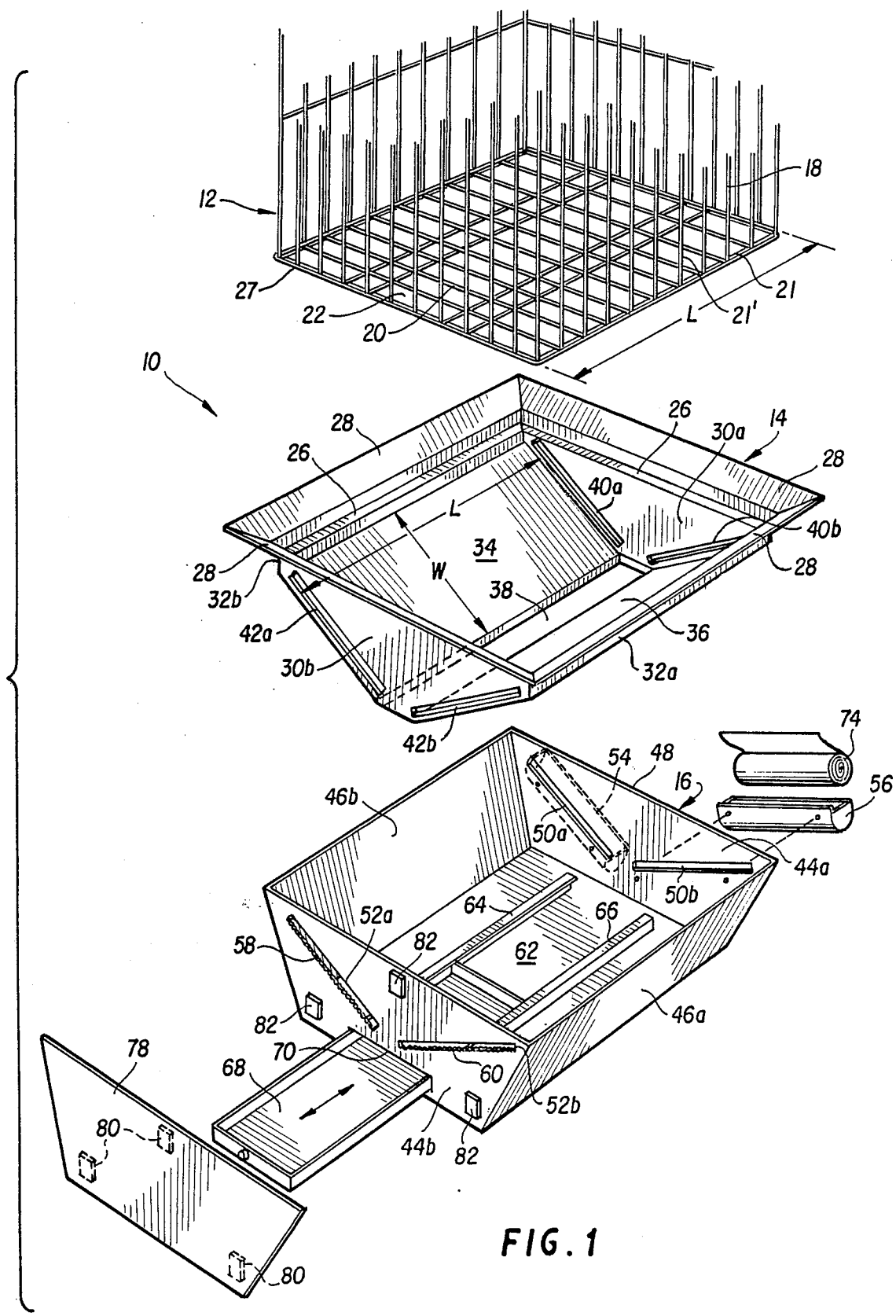
FIG. 1 is an exploded isometric view of the animal cage assembly of this invention.

An animal cage assembly 10 includes a 24 inch ×24 inch rectangular cage 12, an insert assembly 14 and a mounting frame 16, with the insert assembly 14 and the mounting frame 16 forming a base assembly.

The cage 12 is comprised of wires or bars 18 which allow the free passage of air, birdseed, and any other small materials therethrough. In this respect, a floor 20 of the cage, which removably rests on a ledge 21 at the bottom of cage walls 21, is also comprised of widely-separated bars 18 having large spaces 22 therebetween. It can be appreciated that an animal, such as a bird 24 shown in FIG. 2, produces excrement as well as other sticky and dry waste material such as birdseed hulls and the like. Almost all of the excrement, and most of the dry material fall through spaces 22 in the floor 20, however, some of the dried material is also thrown laterally by the bird 24 flapping his wings.

The insert assembly defines a rectangular ledge 26 on which the outer, lower edge 27 of the cage 12 rests. Sloping exterior walls 28 of the insert assembly 14 slope 45° laterally upwardly above the cage floor 20 so as to catch most laterally thrown dried material and cause it to fall back into the cage 12 so that it will pass through spaces 22 in the floor thereof. The insert assembly 14 also has closed, vertical, end walls 30a and 30b and sidewalls 32a and 32b. These vertical end and sidewalls 30a and 30b and 32a and 32b extend from the ledge 26 downwardly to ly and downwardly sloping, approximately 30° to the horizontal, baffles 34 and 36 which are separated by a 24 inch gap 38. In this respect, the baffles 34 and 36 are rectangular in shape and are approximately 24 inches in length L and 12 inches in width W. The end and sidewalls 30a and 30b and 32a and 32b are solid from the ledge 26 to the baffles 34 and 36 with the exception of approximately 12¼ inch sloped inlet paper slots 40a and 40b and outlet paper slots 42a and 42b which are immediately above the sloping baffles 34 and 36 and are parallel thereto.

Figure 2:
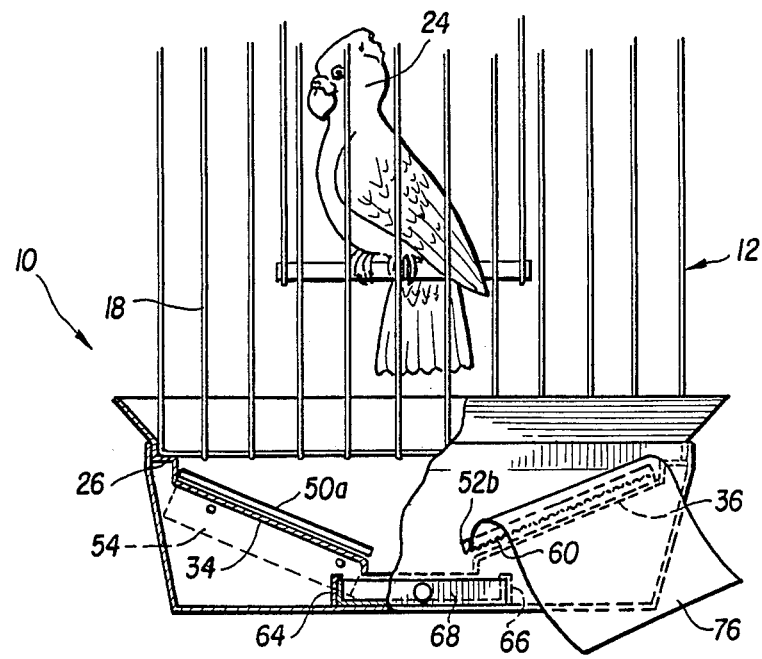
FIG. 2 is an end view of a portion of the animal cage assembly of FIG. 1 fully assembled taken from a direction in which a tray thereof can be seen.
Figure 3:
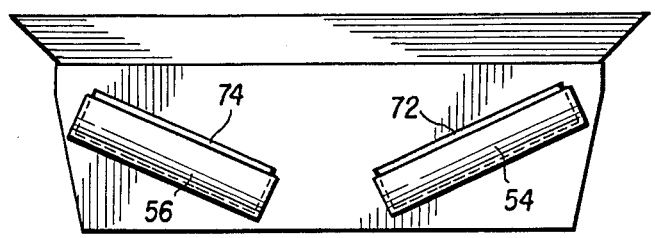
FIG. 3 is an end view taken from the opposite end of the animal cage assembly as in FIG. 2 showing a portion of the cage assembly including two paper rolls in paper roll holders; and, FIG. 4 is an end view of a portion of an alternate embodiment animal cage assembly of this invention.

The mounting frame 16 also has solid end walls 44a and 44b and sidewalls 46a and 46b which are on a slight inward slope. A rectangular top edge 48 formed by the end and sidewalls 44a and 44b and 46a and 46b is of a size and shape such that when the insert assembly 14 is inserted into the top of the mounting frame 16 it strikes the lower sides of the sloping exterior walls 28 of the insert 14 adjacent the ledge 26, as can be seen in FIG. 2. The end walls 40a and 40b also have respective sloped inlet paper slots 50a and 50b and outlet paper slots 52a and 52b which respectively correspond in size, shape and position to the inlet and outlet paper slots 40a and 40b and 42a and 42b of the insert assembly 14. Mounted, such as by rivets, on the outside of the end wall 44a, immediately adjacent the inlet paper slots 50a and 50b, are approximately 12¼ inch long paper roll holders 54 and 56 in the form of semicircular troughs. These paper roll holders 54 and 56 are rivoted to the end wall 44a and are of a length and diameter for holding a standard 12 inch roll of kitchen wax paper.

Similarly, riveted on the outside of the end wall 44b, immediately adjacent, and slightly extending into, the outlet paper slots 52a and 52b are paper blades 58 and 60 against which wax paper can be urged to tear, or cut, the paper along a straight line.

A floor 62 of the mounting frame 16, which is attached at the lower edges of the end and side walls 44a and 44b and 46a and 46b includes L-shaped in cross section tracks 64 and 66 thereon for guiding a drawer, or tray 68. In this respect, the tray 68 passes through a rectangular opening 70 in the end wall 44b of the mounting frame 16 and is guided by the tracks 64 and 66 to be in a position below the entire gap 38 between the downwardly, inwardly sloping baffles 34 and 36. The tray 68 has approximately 14 inch by 24 inch rectangular internal dimensions which correspond to the dimensions of a sheet of newspaper.

In the preferred embodiment the insert assembly 14 and the mounting frame 16 are constructed of a hard, vacuum formed, polystyrene, plastic, however, they could also be constructed of other materials such as metal and wood.

A removable plastic cover 78 having magnets 80 thereon is selectively attachable to magnet complements 82 on the outside surface of the end wall 44b to form a smooth nice-looking surface therefor and also to clamp ends of wax paper in position as is described below. The cover 78 has approximately the same shape as the end wall 44b and tray 68 and the blades 58 and 60 are sufficiently inset so as not to prevent the attachment thereof.

In use, the mounting frame 16 is placed on a supporting surface, with the lower side of the floor 62 resting on the surface, the tray 68 being fully inserted into the rectangular opening 70 and held in position by the tracks 64 and 66, completely covering the area below the gap 38. The insert assembly 14 is then inserted from above into the mounting frame 16 and the cage 12 is placed on the ledge 26 of the insert assembly 14. Standard 12 inch long rolls of kitchen wax paper 72 and 74 are placed in the paper roll holders 54 and 56 and a leading end portion 76 of each of these papers rolls 72 and 74 is pulled through the inlet paper slots 50a and 50b and 40a and 40b, across the baffles 34 and 36, and out through the outlet paper slots 42a and 42b and 52a and 52b. A leading end portion 76 of the paper, extending outside of the mounting frame 16, can be torn from the roll by urging this leading end against the blade 60. In this respect, when one tears the leading paper portion on the blade 60 he is careful to hold the new end of the roll to prevent it from receding into the slots 52b and 42b. He then pulls this new end a short distance outside the slot 52b so as to form a paper tab somewhat shorter than the paper tab shown in FIG. 2. He then attaches the cover 78 to the end wall 44b with the magnets 80 and thereby clamps the paper end tab between the cover 78 and the end wall 44b to prevent it from receding during use of the cage assembly. If the paper should recede through the slots 52a or 52b one needs only to insert his hand through a door of the cage 12, lift the floor 20 from the ledge 21 and guide the paper through the slots 42a and 42b and 52a and 52b from inside the insert assembly.

As waste materials, such as birdseed, birdseed hulls, and excrement, fall through the spaces 22 in the floor 20 of the cage 12 it falls on the paper on the sloping baffles 34 and 36. Loose dried materials are guided by the paper on the sloping baffles 34 and 36 to fall through the gap 38 into the tray 68. On the other hand, excrement and other sticky material which falls on the paper which is extended across the baffles 34 and 36 stick to the paper. Periodically, the cover 78 is removed, the leading end portions 76 of the paper rolls are pulled out of the paper outlet slots 42a and 42b and 52a and 52b and those portions thereof which are dirty are ripped from the remaining leading edge by urging the paper against the blades 58 and 60 and disgarded. Also periodically, the tray 68 is emptied. A standard 14 inch by 24 inch piece of newspaper is placed in the tray 68 which can be replaced when the tray 68 is cleaned out.

It will be appreciated by those of ordinary skill in the art that a downdraft caused by the flapping of wings by a bird 24 tends to drive materials down the sloped baffles 34 and 36 through the gap 38 into the tray 60. The large size of the tray which appears to be larger than is necessary to cover the gap 38, insures that these dried materials are not blown beyond the tray.

Also, it will be understood by those skilled in the art that dried materials thrown by the bird 24 laterally out of his cage will be caught by the sloping exterior walls 28 and guided back into the cage.

It will be further appreciated that the animal cage assembly of this invention is compact and visually appealing. Further, it is easy to use in that it does not require the cutting of unusually shaped paper but rather uses standard-size rolls of wax paper and standard size newspaper. Still further, the baffles 34 and 36 are sized such that they are fully covered by the wax paper and there are no gaps between the paper positioned vertically below the cage 12 through which sticky materials can come into contact with the baffles 34 and 36. Thus, the animal cage assembly of this invention can be quickly cleaned by simply pulling additional paper from the rolls 72 and 74 and ripping it off on blades 58 and 60 and by emptying the tray 68. It should be noted that the length L of the baffles 34 and 36 is as least as great as the length L of the cage 12 along their entire widths W so that anything falling vertically through the cage floor 20 must strike either one of the baffles 34 and 36 or fall through the gap 38.

Figure 4:
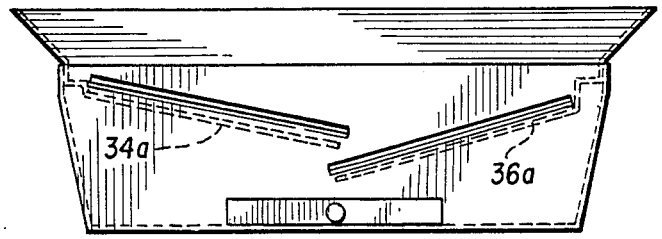

While the invention has been particularly shown and described with reference to a preferred embodiment, it will be understood by those skilled in the art that various changes in form and detail may be made therein without departing from the spirit and scope of the invention. For example, with reference to FIG. 4 it would be possible to place sloped baffles 34a and 36b at different vertical levels with the bottom edge of the higher baffle 34a being positioned approximately over the bottom edge of the lower baffle 36a so that material first falling on the higher baffle also falls on the lower baffle, thereby not leaving a horizontal gap between the baffles through which sticky materials fall directly into a tray 68a. In this manner, sticky materials could not fall directly into the tray 68 so that it would not be necessary to place paper therein. Such a structure might require a taller cage assembly and would require a narrower cage. It would also be possible to have a single sloped baffle (not shown) passing under the entire cage leading to a tray (not shown) positioned below the lower edge of the baffle. Such an arrangement would need to be taller still and would probably only be useful for unusually small cages. In both of these alternate embodiments inlet and outlet paper slots and paper roll holders cooperate with the baffles to provide paper on the baffles in the manner described above. The lengths of the baffles are at least as great as the lengths of the cages over the entire widths of the baffles.

It would be possible to place the baffles 34 and 36 at different angles from those mentioned above and it would also be possible to use different dimensions, although significantly different dimensions would probably require compromises among various beneficial features of the invention.

The embodiment of the invention in which an exclusive property or privilege are claimed as follows:

1. An animal cage assembly comprising:
    a cage for holding an animal, said cage having a floor comprising slats with relatively large opening therebetween through which excrement and other material from an animal in said cage can fall;
    a base assembly positioned below said cage, said base assembly comprising a baffle means positioned below the floor of said cage for defining at least two substantially vertical sides and at least one sloping guide surface leading downwardly to a gap positioned at bottom edges of said downwardly sloping guide surfaces, each said downwardly sloping guide surface and said gap having a length which is at least approximately as long as the floor of the cage for all those portions of the guide surface positioned below the floor of the cage, substantially the entire area located vertically under said cage floor being covered by a downwardly sloping guide surface and said gap, whereby materials falling vertically downwardly through the openings in the cage floor come into contact with a guide surface or pass directly through the gap located therebelow, said base assembly further comprising a tray positioned below said gap, and having a length dimension approximately as great as that of said gap, for receiving materials passing vertically downwardly through said gap, said base assembly further comprising a paper roll holder positioned adjacent each said sloping guide surface whereby a leading-end portion of a roll of paper in each said roll holder can be pulled across its respective sloping guide surface and left there to protect said baffle means;
    whereby virtually all excrement and other materials falling vertically downwardly from said animal cage either pass directly through any part of said gap located therebelow into said tray or strike paper on a sloping guide surface so that sticky materials stick to said paper and non-sticky materials are directed through said gap into said tray, and whereby a dirty, leading end portion of each said paper roll can be periodically pulled across its respective sloping guide surface while simultaneously bringing a fresh portion of paper onto the guide surface and the leading dirty end portion can be torn from said paper roll and discarded.

2. An animal cage assembly as in claim 1, wherein said base assembly includes each said paper roll holder on the outside of solid end walls thereof.

3. An animal cage assembly as in claim 2, wherein is included a paper cutting blade located on the outside of an end wall of said base assembly opposite from the end wall on which each said paper roll holder is mounted.

4. An animal cage assembly as in claim 1, wherein said base assembly comprises:
    a mounting frame including a track for slidingly mounting said tray thereon and a separate insert mounted on said base assembly including said baffle means.

5. An animal cage assembly as in claim 4, wherein both said mounting frame and said insert have solid end walls with inlet and outlet paper slots therein through which said paper passes.

6. An animal cage assembly as in claim 1, wherein each said sloping guide surface is approximately 12 inches wide.

7. An animal cage assembly as in claim 1, wherein there are two opposite sloping guide surfaces sloping downwardly toward one another and the gap is defined by the lower edges of the two sloping guide surfaces, with each guide surface having a length which is at least approximately as long as the floor of the cage for all those portions of the guide surface positioned below the floor of the cage, said sloping guide surfaces being positioned so that they and any horizontal portion of said gap approximately cover the entire area lying vertically under the cage floor, there being a paper roll holder for each sloping guide surface.

8. An animal cage assembly as in claim 7, wherein each of said sloping guide surfaces is approximately 12 inches wide 9. An animal cage assembly as in claim 8, wherein said tray has an internal dimension of approximately 14 inches by 24 inches.

10. An animal cage assembly as in claim 7, wherein said tray is significantly wider than the width of said gap and wherein the baffle means at the bottom edge of each of said downwardly sloping guide surface is not in sealing contact with said tray but rather said tray is located therebelow.

11. An animal cage assembly as in claim 7, wherein said base assembly comprises a mounting frame and a separate insert mounted on said base assembly including said baffle means, both said mounting frame and said insert having solid end walls with inlet and outlet paper slots therein through which paper passes.

12. An animal cage assembly as in claim 7, wherein said base assembly comprises:
a mounting frame including a track for slidingly mounting said tray thereon and a separate insert mounted on said base assembly including said baffle means.

13. An animal cage assembly as in claim 12, wherein both said mounting frame and said insert have solid end walls with inlet and outlet paper slots therein through which said paper passes.

14. An animal cage assembly as in claim 1, wherein said tray has an internal dimension of approximately 14 inches by 24 inches.

15. An animal cage assembly as in claim 1, wherein said tray is significantly wider than the width of said gap and wherein the baffle means of the bottom edge of each of said downwardly sloping guide surface is not in sealing contact with said tray but rather said tray is located therebelow.

16. An animal cage assembly as in claim 1, wherein said base assembly comprises a mounting frame and a separate insert mounted on said base assembly including said baffle means, both said mounting frame and said insert having solid end walls with inlet and outlet paper slots therein through which paper passes.

* * * * *